March 11, 1958

N. A. NELSON 2,826,430

TRACTOR-IMPLEMENT COUPLING MECHANISM

Filed Sept. 9, 1953

INVENTOR.
NORAL A. NELSON
BY
Carlson, Pitzner, Hubbard & Wolfe
ATTORNEYS.

March 11, 1958 N. A. NELSON 2,826,430
TRACTOR-IMPLEMENT COUPLING MECHANISM
Filed Sept. 9, 1953 3 Sheets-Sheet 2

INVENTOR.
NORAL A. NELSON
BY
Carlson, Pitzner, Hubbard & Wolfe
ATTORNEYS.

March 11, 1958   N. A. NELSON   2,826,430
TRACTOR-IMPLEMENT COUPLING MECHANISM
Filed Sept. 9, 1953   3 Sheets-Sheet 3

INVENTOR.
NORAL A. NELSON
BY
Carlson, Pitzner, Hubbard & Wolfe
ATTORNEYS.

United States Patent Office 2,826,430
Patented Mar. 11, 1958

2,826,430

TRACTOR-IMPLEMENT COUPLING MECHANISM

Noral A. Nelson, Holland, Mich., assignor, by mesne assignments, to Massey-Harris-Ferguson Inc., Racine, Wis., a corporation of Maryland Application September 9, 1953, Serial No. 379,185

5 Claims. (Cl. 280—456)

The present invention relates in general to mechanisms for coupling implements in semi-mounted fashion to a tractor, that is, with part of the implement weight supported by the tractor and part by an implement ground wheel, and with the tractor and implement arranged to be driven as a unit. The invention relates more particularly to such coupling mechanisms which may be engaged or disengaged by maneuvering the tractor relative to the implement and utilizing a power-actuated rear hitch, by an operator remaining on the tractor.

In applicant's copending application Serial No. 218,636, filed March 31, 1951, (now Patent 2,707,643) there is described an advantageous arrangement for coupling a semi-mounted implement to a tractor by which the motive power of the tractor may be employed in maneuvering it into proper position with respect to the implement to bring coupling elements into registry. In this copending application, the implement frame is supported by front and rear retractable jack elements when not coupled to the tractor. The tractor may be backed up so that a coupling element at its rear portion underlies a cooperating coupling element on the implement frame, after which the operator may get off the tractor and lower the rear jack stand until the coupling elements engage. Further, the tractor may then be backed and maneuvered, pivoting about the rear coupling point, until front coupling elements on the tractor and implement frame swing into mating position, after which the operator may dismount and lock them by means of a suitable pin. The front jack stand is then retracted so that the implement is connected to the tractor for partial support of its weight, and for propulsion, while the remaining part of its weight is carried by an outboard implement ground wheel.

This arrangement is particularly advantageous in that the implement need not be displaced or moved over the ground in any manner during the coupling or uncoupling operation, although, as explained, it is necessary for the operator to mount and dismount from the tractor in order to operate the jack stands and lock the forward coupling elements.

The present invention constitutes an improvement over that of applicant's said copending application and has for its primary object the provision of a coupling mechanism for connecting or disconnecting a semi-mounted implement to a tractor, all without the necessity of the driver getting up off his seat.

It is another object of the present invention to provide such a coupling mechanism completely operable from the tractor driver's seat by means of a power-actuated rear hitch mechanism now often found on tractors, as for example in the familiar Ferguson tractor, for receiving fully mounted implements such as plows and other tillage implements.

It is another object of the present invention to provide such a coupling mechanism engaged upon powered elevation of a rear hitch mechanism for the tractor which serves at the same time to elevate and lower the implement frame, thereby obviating the necessity for rear jack means and rendering adequate a simpler and less expensive support.

It is still another object of the invention to provide an improved snap-coupling between the tractor and the implement, adapted to lock automatically upon engagement of its elements, and to be tripped manually from the driver's seat.

A still further object of the present invention is to provide a novel alinement arrangement in a coupling mechanism of the foregoing type whereby the operator may quickly and accurately aline the elements of a rear coupling through observations made from the driver's seat. After such alinement, accomplished by maneuvering the tractor, the power-actuated rear hitch mechanism may be energized from the driver's seat to engage and lock the coupling elements and to elevate the implement frame from its stored position.

Further objects and advantages will become apparent as the following description proceeds, taken in conjunction with the accompanying drawings, in which.

Figure 1:
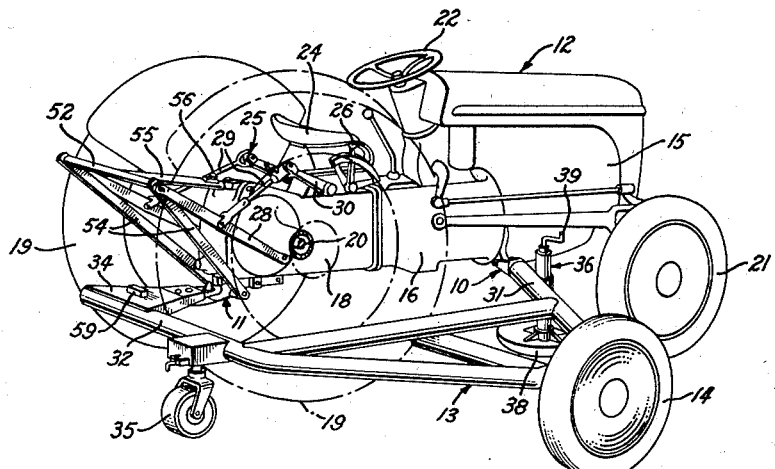
Figure 1 is a perspective view of a tractor and implement frame joined by a coupling mechanism embodying the present invention, the near rear wheel of the tractor being shown in phantom (outlined in dot-dash lines) to avoid obscuring the view of the parts behind it.

While in the drawings and following description there is shown and described a preferred form of the invention in connection with the details of a particular tractor, implement frame, and power-actuated rear hitch mechanism on the tractor, it is to be understood that these are given by way of example and with no intention of limiting the invention. On the contrary, it is intended to embrace all modifications, alterations, and equivalents within the spirit and scope of the invention defined in the appended claims.

Referring now to the drawings, the present coupling mechanism includes fore and aft couplings 10, 11 and is illustrated as applied between a tractor 12 and a frame 13 for a semi-mounted implement having an outboard ground wheel 14. By way of introduction, the portions of the particular tractor and implement illustrated which coact more or less directly with the novel coupling mechanism will be brifley described so that the environment of the invention will be clear.

The tractor 12 itself may take any suitable form. That illustrated here will be recognized by those skilled in the art as the familiar "Ferguson" tractor having a forward engine section 15, a medial transmission 16, and a rear center housing 18. Large rear traction wheels 19 are carried by axles 20 extending transversely from the center housing 18, while two steerable front wheels 21 are provided, operable by means of a steering wheel 22 located forward of an operator's or driver's seat 24.

The tractor is equipped with a power-actuated rear hitch mechanism 25 which is, more specifically, vertically positionable by means of hydraulic fluid pressure controlable through the positioning of a quadrant lever 26 located adjacent the driver's seat 24. For further details of such exemplary power-actuated hitch mechanism, reference may be had to Ferguson Patent 2,118,180. For the present it will suffice simply to identify those parts of the hitch mechanism which are operatively associated with the coupling mechanism of the present invention. Trailing from the rear end of the tractor are a pair of draft links 28 disposed in forwardly converging, side-by-side relation and pivoted on the center housing 18 of the tractor to swing vertically in unison, as well as to sway laterally. The pivot connections are located below and slightly forward of the rear axles 20. Drop links 29 suspend the draft links 28 from crank arms 30 rigidly fixed to opposite ends of a transverse rock shaft (not shown) which is rocked by a hydraulic mechanism (not shown) under the control of the quadrant lever 26.

Figure 2:
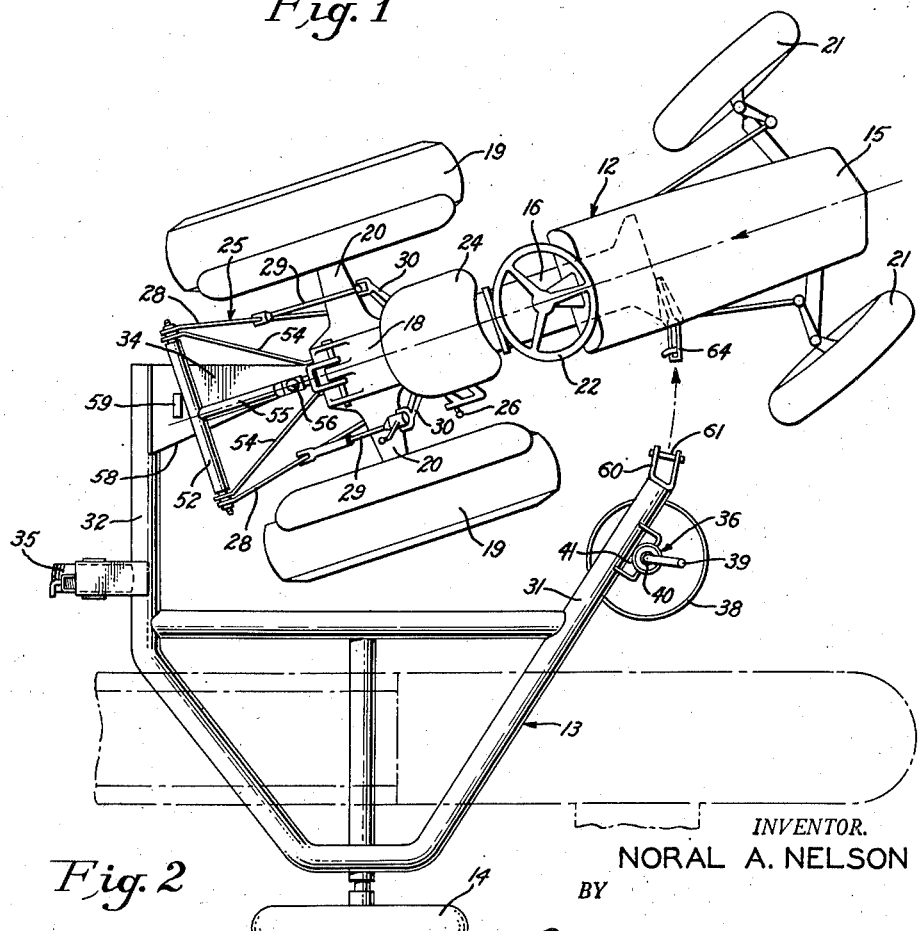
Fig. 2 is a plan view of the implement frame and tractor installation of Fig. 1 and illustrating one step in the convenient engagement or disengagement of the forward coupling.
Figure 3:
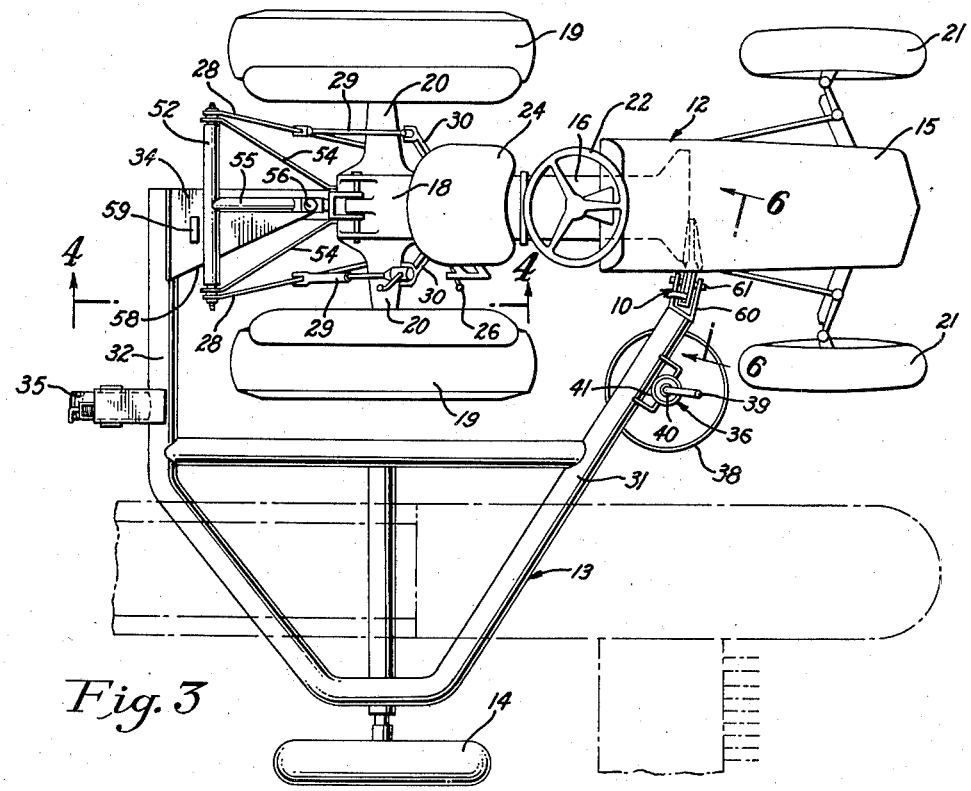
Fig. 3 is similar to Fig. 2, illustrating the coupling elements between the tractor and implement engaged and locked.
Figure 5:
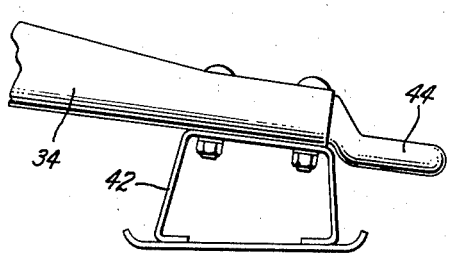
Fig. 5 is a fragmentary detail view, corresponding to a part of Fig. 4, and illustrating a modification of the aft storage support for the implement frame made particularly suitable by the coupling mechanism of the present invention.

The implement may take any of a variety of forms, having a suitable body (indicated by dashed lines in Figs. 2 and 3) carried on the frame 13 which may be adapted as required for various implements such as combines, forage harvesters, balers, corn pickers, etc., which are relatively heavy and bulky. In the preferred form, the frame 13 is generally A-shaped (when viewed from above as in Fig. 2), formed of rigidly welded parts including the front and rear transversely extending beams 31 and 32 arranged to substantially embrace a right rear wheel 19 of the tractor and present themselves for coupling to the underside of the tractor center housing 18 and to a point forward of the wheel 19 at the front end of the transmission 16. In further providing this embracing geometry, the frame 13 has a forwardly projecting tongue 34 secured at the end of the rear beam 32. The outboard ground wheel 14 is positioned at the apex of the A and generally parallel to the adjacent rear tractor wheel 19. The frame 13 may be supported when not in use by the outboard wheel 14, a retractable castor wheel 35 on the rear beam, and a jack stand 36 having a substantially flat foot 38 adapted to be manually raised and lowered by a hand crank 39 on a threaded element 40 cooperating with a tapped sleeve 41 welded to the forward beam 31. In lieu of the castor wheel 35, a simple bracket-type rear support 42 may be provided, bolted to the underside of the tongue 34 (Fig. 5).

Pursuant to the present invention, provision is made for coupling the tongue 34 of the frame 13 to the rear of the tractor 12 and the end of the forward beam 31 to a ledge at the front end of the transission housing 16 of the tractor. The rear coupling 11 is engageable upon the actuation of the hitch mechanism 25, and the front coupling 10 is made to snap and lock upon engagement of its elements as an incident to lateral jack-knifing of the tractor 12 and implement frame 13 about the rear coupling.

Figure 4:
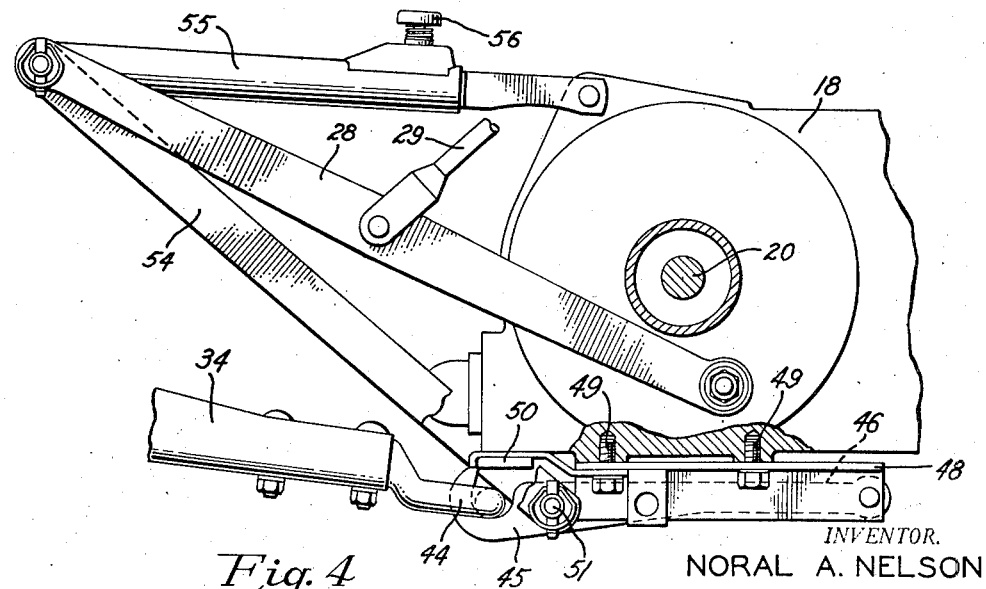
Fig. 4 is a fragmentary sectional view taken substantially along line 4—4 in Fig. 3, and particularly illustrating an aft coupling between the implement and tractor.

The rear coupling 11 includes two coacting elements which may be in the form of an eye 44 bolted to the tongue 34 and a hook 45 pivotally secured to the underside of the center housing 18 (Fig. 4). The hook 45 is pivoted at the forward end of its shank 46 between two laterally spaced angle irons 48 held by cap screws 49 threaded into the center housing 18. When raised, the hook 45 is closed by a tab 50 also bolted to the center housing 18. A pivotal linkage is connected between projections 51 on either side of the hook 45 and the hitch mechanism 25, so that movement of the latter swings the hook about its forward pivot point.

In the preferred form here shown, the mounting of the hook 45 to the underside of the tractor and its adaptation to be vertically swung by the hitch mechanism 25 may be arranged as more fully described and claimed in the copending application of Theo Sherwen, Serial No. 63,404, filed December 3, 1948, and assigned to the assignee of the present application. Briefly, this includes a cross arm 52 connected between the free extremities of the draft links 28 together with the two links 54 pivotally carried by the cross arm 52 and extending downwardly for pivotal connection to the projections 51 on the hook 45. A telescoping strut 55 is also pivotally connected between the cross arm 52 and vertically spaced flanges on the upper side of the center housing 18. It includes a snap acting latch arrangement, manually tripped by pressing an upwardly extending spring biased release rod 56. Thus, in the arangement shown, as the draft links 28 are raised and lowered by operating the quadrant lever 26, the hook 45 is swung up and down about its connecting pin at 46 on the underside of the center housing 18. Once the hook 45 has been raised to its horizontal position, the snap acting latch on the telescopic strut 55 engages to positively prevent the lowering of the mechanism until the trip rod 56 is manually depressed. By this organization the power actuated hitch mechanism 25 may be utilized to raise and lower the hook, but when it is once raised it is automatically locked so that further hydraulic force is not required to retain it in such position.

Since the hook member 45 or tractor-borne element of the rear coupling 11 is not readily visible to the operator from the driver's seat 24, further arrangements are provided to conveniently permit the positive alinement of the rear coupling elements before the hook is raised by the hitch mechanism. In the form illustrated, a line or part of the tongue 34, preferably its right edge 58, is oriented to be visually alined with the rearwardly projecting telescopic strut 55 (Fig. 2) when the hook 45 and eye 44 are transversely alined beneath the center housing 18. Further, a vertically extending stop member 59 may be secured, as by welding, at the proper location on the tongue 34 to be engaged by the lowered cross bar 52 as the tractor 12 is backed up to the frame 13. The location of the stop 59 is chosen so that when the cross arm 52 abuts it, the hook and eye are longitudinally alined beneath the center housing. Through the combination of this visual alinement of the right edge 58 of the forward projection and the telescopic strut 55 and the abutting of the cross bar 52 against the stop 59, the driver, remaining in his seat, may be assured that the rear coupling elements 44 and 45 will engage when the hitch mechanism is elevated.

Figure 6:
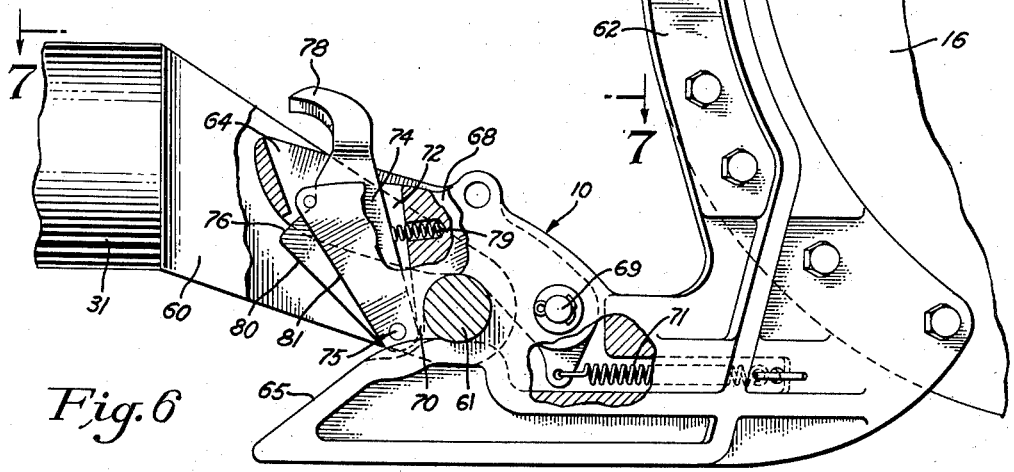
Fig. 6 is a fragmentary elevation, partially in section, taken substantially along line 6—6 in Fig. 3, showing a forward coupling between the implement and tractor.
Figure 7:
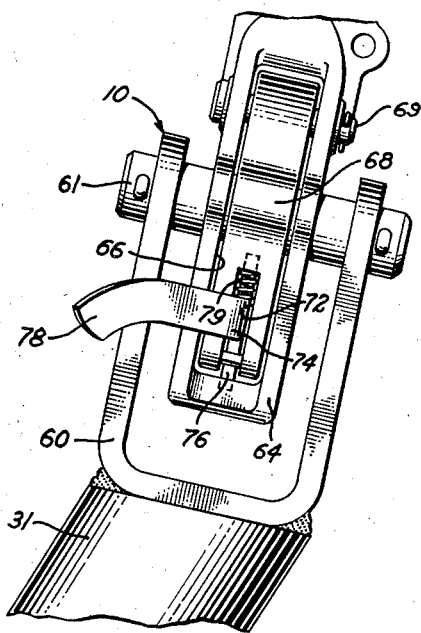
Fig. 7 is a fragmentary plan view of the forward coupling between the implement and tractor.

The forward coupling 10 comprises a latched element suitably secured, as by welding, to the extremity of the forward beam 31 and which includes a generally U-shaped clevis 60 apertured to receive a cross member or lock pin 61 (Figs. 6 and 7). A cooperating latching element is supported on the tractor by suitable means such as an apertured bracket 62 bolted on the transmission housing 16 in a position to receive the pin 61 upon closing swing of the frame and tractor. It is formed by a transversely extending V-shaped body having upper and lower jaws 64 and 65. As best seen in Fig. 7, the upper jaw 64 is formed by spaced parallel sides defining a generally rectangular vertical opening 66. Within this opening 66, a latch 68 is pivoted for vertical swing by suitable means such as a pivot pin 69. The latch is shaped to include a downwardly extending ear 70 abutting the lower jaw 65 and closing the entrance into the body. It may swing vertically to open this entrance, but is spring biased to the former position by a tension spring 71. In order to lock the latch 66 in its closed position, a slot 72 is provided in its outer end, receiving a pawl 74 pivotally secured by a suitable pin 75. The pawl 74 includes a lip 76 engageable with the extremity of the upper jaw 64 for preventing opening movement of the latch member 68, together with a suitable handle or projection 78 for swinging it about its pivot pin 75 to clear the upper jaw and permit the latch 68 to be raised. Biasing means, such as a compression spring 79, is provided for urging the pawl to its locking position.

It will be seen that as the cross pin 61 on the frame approaches the jaws 64, 65 of the latching element, it strikes an inclined surface 80 provided on the pawl 74 and cams it to pivot against the force of its spring 79 to a position where the lip 76 clears the upper jaw 64. Further movement of the cross pin 61 results in its striking a second inclined surface 81 provided on the outer side of the latch 68. This raises the latch 68 about its pivot pin 69 and permits entry of the cross pin 61 into the V-shaped jaws. Once the cross pin 61 is thus positioned, the springs 71 and 79 cause the latch 68 and pawl 74 to return to their closed and locked positions as shown, so that the coupling elements are positively engaged and may not be disconnected until the pawl 74 is manually moved about its pivot pin.

When the pawl 74 is so tripped against the force of its biasing spring 79 to move the lip 76 clear of the jaw 64, the latch 68 is pulled open to free the pin 61 as the latter is withdrawn from the jaws 64, 65, the pawl rocking about its pivot pin 69 against the force of its biasing spring 71.

Coupling operation

With implement frame 13 initially supported by the rear castor wheel 35, the front stand 36, and the ground wheel 14, it is but a simple matter to couple it to the tractor 12. With the hook 45 in lowered position, the tractor is maneuvered until the hook underlies the eye 44. The operator may be assured of this alinement by causing the right edge 58 of the tongue 34 to be visually registered with the telescoping strut 55, and by backing the tractor until the cross arm 52 engages the stop 59. A reasonably wide tolerance in the accuracy of the location is permitted by the present mechanism. Actuation of the hitch mechanism 25 then raises the hook 45, engaging it with the eye 44 and lifting the frame 13 so that its rear support 35 clears the ground. The hook 45 is locked in its horizontal position by the snap latch of the telescopic strut, whereupon the lifting force of the hydraulic system may be discontinued. The engaged hook 45 and eye 44 leave the tractor and implement free to swing relatively about a vertical axis.

Once the rear coupling 11 is engaged and locked, the tractor is backed further, causing a lateral jackknifing (Fig. 2) of the tractor and implement. The cooperating elements of the forward coupling thus swing together, the cross pin 61 on the implement sliding into the jaws 64 and 65 and being locked. The forward stand 36 may then be reached by an operator from the driver's seat 24 to rotate its handle 39 and raise its foot 38 from engagement with the ground. The entire operation of backing the tractor to vertically aline the rear coupling elements, raising the hook by actuating the power hitch mechanism until the telescopic strut latch engages, further backing and swinging the tractor until the front coupling elements engage and lock, and raising the front jack, may all be accomplished by the operator from his seat.

It will be apparent that the rear hook-and-eye coupling 11 will permit, within limits, the frame and tractor to pivot relatively about the fore and aft axis. Since the front coupling 10 permits the cross pin 61 to rotate about its longitudinal axis, either in the jaws 64, 65 or in its clevis 60, the entire implement frame 13, when attached, may pivot relative to the tractor about a fore and aft axis to "float" over uneven ground.

Quick de-coupling of the frame 13 from the tractor 12 may be effected in essentially reverse order. It is necessary only for the operator to lean forward and lower the foot 38 of the front stand 36 by rotating its screw handle 39, and to move the pawl 74 against the force of its biasing spring 79 through the use of his right foot against the projection 78, whereupon forward movement of the tractor, with its front wheels turned away from the implement, separates the front coupling elements. The release rod 56 on the telescopic strut 55 may then be manually depressed to permit the hitch mechanism to lower the hook member 45 about its pivot at 46 and disengage it from the eye 44 on the tongue 34, at the same time lowering the rear castor wheel 35 back into engagement with the ground.

From the foregoing description, it will be apparent that the improved coupling mechanism described provides for the convenient attachment or detachment of a semi-mounted implement to a tractor for combined operation. The operator may remain on the tractor at all times and there is no necessity for manual raising or lowering of the rear portion of the frame in order to effect the engagement and locking of the rear coupling elements. This permits the use of a more simplified and economical rear support, such as the castor wheel or stand. The equipment on the tractor itself, necessary for employment of the present invention, finds convenient use in other applications of the tractor, and the investment required for such diversified utility is relatively small.

I claim as my invention:

1. For use with a tractor having an elevatable rear hitch mechanism operable from the driver's seat, the combination of a frame having a ground wheel and laterally projecting front and rear beams located to substantially embrace a rear traction wheel of the tractor from the outer side thereof with the rear beam located behind such traction wheel and the front beam located forward of it; a first coupling including a first element adapted to be carried by a rear end portion of the tractor and connected with said hitch mechanism to be vertically movable by the latter, and a second element carried by said rear beam and engageable and disengageable by said first coupling element upon vertical movement thereof; said first and second coupling elements being constructed and arranged to leave said frame and tractor free to swing laterally with respect to each other while coupled; a second snap coupling including a latching element and a latched element, one carried forwardly on the tractor and the other carried by said front beam in such positions as to automatically engage and lock upon relative swinging of the tractor and implement as an incident to rearward movement of the tractor after said first coupling is engaged, whereby the frame may be coupled to the tractor by maneuvering the tractor to vertically aline said first and second coupling elements, elevating said hitch mechanism to engage said first and second elements, and further backing the tractor to swing the implement relative thereto to cause engagement of said latching and latched element, all by an operator remaining in the driver's seat.

2. In an arrangement for side-mounting an implement on a tractor, a snap-acting coupling for automatic engagement upon relative movement of the tractor and implement into side-by-side relation comprising, in combination, a latched element adapted to be mounted on the implement and including a cross pin, a latching element adapted to be mounted on the tractor and including a V-shaped body having spaced jaws, a latch pivotally mounted in said body to swing between positions opening and closing the entrance to said jaws, first spring means biasing said latch to the latter position, a pawl pivotally mounted in said latch and having a lip removably engaging said body to lock said latch in said latter position, second spring means for biasing said pawl to its locking position, said pawl and latch having inclined surfaces engageable by said cross pin upon entry of the latter into said jaws to cam them against the force of their spring means to unlock said latch and move it to open the entrance of said jaws, whereby said cross pin may be snap-coupled into said latching element and locked therein until said pawl member is manually moved to disengage said lip from said body, such disengagement of said lip permitting said latch to be pulled open by said pin as the latter is withdrawn from said jaws.

3. A coupling mechanism comprising, in combination, a latched element including means supporting a cross member, and a cooperating latching element including a body having V-shaped jaws, a latch, means pivotally mounting said latch member in said body, a pawl, means pivotally mounting said pawl in said latch, a lip on said pawl releasably engaging said body, first spring means for biasing said latch member to a position in which it closes said entrance to said jaws, second spring means for biasing said pawl to engage said body to prevent opening of said entrance by movement of said latch, and inclined surfaces on said pawl and latch cooperating with said cross member upon its entry into said jaws to move said lip away from said body and raise said latch member, said spring means and latch member holding said cross member in locked relation until said lip is again moved from engagement with said body, whereby the latch is pulled open by said cross member as the latter is withdrawn from said jaws.

4. In an arrangement for side-mounting an implement on a tractor wherein a first coupling element is carried on the rear underside of the tractor and adapted to swing vertically upon actuation of a hitch mechanism, and a second coupling element is carried by the implement, means for visually alining said elements prior to actuation of the mechanism to engage them comprising, in combination, a rearwardly extending strut on said tractor and a line on said implement aft of said second coupling element located to be alined as viewed from an operator's position on the tractor when said elements are transversely alined, a transverse member on the rear of said tractor and a stop on said implement aft of said second coupling located to abut one another when said elements are longitudinally alined.

5. In an arrangement for side mounting an implement on a tractor, a visually alined coupling mechanism comprising, in combination, an implement frame adapted to be stored in a position elevated from the ground and having a transverse beam and a forwardly extending tongue carried at the end thereof, a power-operated hitch mechanism on the rear of the tractor including a pair of laterally spaced hitch links pivoted to the tractor, a transverse cross arm extending between the free ends of said hitch links, and a telescopic strut pivotally mounted between said tractor and cross arm, a coupling having a first element mounted on said tongue and a second cooperating element on the rear under side of the tractor adapted to releasably engage upon vertical movement of the latter, means connecting said second element to be vertically moved by said hitch mechanism, a fore and aft line of said tongue being located to aline with said strut, as viewed by an operator from the tractor driver's seat, when said first and second elements are alined transversely, and a vertical stop projection on said forwardly extending tongue located to abut said cross arm when said hitch mechanism is lowered and said first and second elements are alined in a fore and aft direction.

References Cited in the file of this patent
UNITED STATES PATENTS

| | | |
|---|---|---|
| 831,977 | Nilsen | Sept. 25, 1906 |
| 1,333,384 | Buller | Mar. 9, 1920 |
| 2,335,942 | Hyman | Dec. 7, 1943 |
| 2,416,731 | Baldwin | Mar. 4, 1947 |
| 2,491,963 | Fons | Dec. 20, 1949 |
| 2,555,987 | Nelson | June 5, 1951 |
| 2,617,660 | Hadlock | Nov. 11, 1952 |
| 2,707,643 | Nelson | May 3, 1955 |